United States Patent [19]
Wallace et al.

[11] 3,805,326
[45] Apr. 23, 1974

[54] LOCKING MECHANISM

[75] Inventors: Earl C. Wallace; Richard A. Bell, both of Andrews, Ind.

[73] Assignee: General Engineering & Manufacturing Corporation, Andrews, Ind.

[22] Filed: Mar. 5, 1973

[21] Appl. No.: 337,898

Related U.S. Application Data

[63] Continuation of Ser. No. 130,312, April 1, 1971, abandoned.

[52] U.S. Cl.................................. 16/146, 297/367
[51] Int. Cl............................................. E05d 11/10
[58] Field of Search ............ 16/144, 146, 147, 142, 16/145; 297/64, 354, 355, 367, 368, 369, 372; 287/14; 292/262, 265–267, 273, 274

[56] References Cited
UNITED STATES PATENTS

| 2,032,600 | 3/1936 | Smith | 292/266 X |
| 3,185,525 | 5/1965 | Welsh | 297/367 |
| 702,304 | 6/1902 | Holse et al. | 16/146 |
| 1,044,280 | 11/1912 | Sontheimer | 16/146 |
| 1,603,409 | 10/1926 | Rickenbacher | 16/144 |
| 2,177,408 | 10/1939 | Haslop | 297/369 |
| 2,934,783 | 5/1960 | Johnson | 16/146 |
| 3,012,269 | 12/1961 | Bartel | 292/262 XR |
| 395,194 | 12/1888 | Waring | 312/290 X |
| 3,352,580 | 11/1967 | Kurz et al. | 16/146 X |

Primary Examiner—James C. Mitchell
Attorney, Agent, or Firm—Wilson & Fraser

[57] ABSTRACT

Two cam operated pawls are pivotally attached to a first hinge plate each having a detent on the end opposite the pivotal connection to alternately engage staggered notches on opposite edges of a locking arm attached to a second hinge plate causing one detent to be armed to lock within a notch whenever the other detent is released from a locked position whereby the hinge plates can be locked with respect to pivotal movement relative to each other and released only for incremental movements of the total range of movement at any one time.

9 Claims, 6 Drawing Figures

INVENTORS
EARL C. WALLACE
RICHARD A. BELL

BY Wilson & Fraser

ATTORNEYS

LOCKING MECHANISM

This is a continuation of application Ser. No. 130,312, filed Apr. 1, 1971 and now abandoned.

BACKGROUND OF THE INVENTION

Heretofore it has been known to those skilled in the art that the hinge plates of a seat having a collapsible or adjustable back support could be locked in place relative to each other by using pawls attached to one hinge plate to engage notches on a member attached to the other hinge plate. Often times the locking means would only function to prevent the back support from falling back away from the seat portion because movement of the back support toward the seat portion was used to unlock the seat. Where the locking means did not require movement of the back support for releasing purposes, it was required that a cam mechanism release the pawl from the notch resulting in the back support being free to move relative to the seat portion in either direction.

Such locking means are not suitable for many seat uses because of the degree of freedom of movement between the back support and seat portions, and most especially in vehicle seats where the emphasis is on the safety of the individual occupying the seat. Under present rigid safety standards, the occupant must be protected by fail safe devices not only against whiplash, but also from forces up to 20 times the occupant's weight which is the equivalent of impact with an immovable object at a speed of 30 miles per hour.

The present invention overcomes the above problems, being especially suitable for use in vehicle seat structures, by maintaining the relative position of the pivotal seat portions against either forward or backward forces, and further is fail safe in the locking means whereby release is only effective for an incremental step of the total range of movement of the seat portions relative to one another.

SUMMARY OF THE INVENTION

The present invention relates to locking mechanisms and more particularly to positive locking mechanisms for pivotally connected members having detents attached to one of the members and means for engaging the detents attached to the other member. Means for disengaging the detents from the engaging means is provided. Only one detent at a time is engageable by the disengaging means so that staggering the engaging means results only in one of the detents being engageable by the engaging means at one time. The disengaging means is therefore capable of releasing the locking mechanism by disengaging the detent engaged by the engaging means. Means for biasing the detents into engagement with the engaging means is provided to operate in such a fashion that whenever one detent is released, the other detent is in a position and biased for engagement with the engaging means upon a predetermined relative movement of the pivotal members. Limiting the movement of the pivotal members to incremental steps no matter what the position or movement of a lever operating the contacting means results in a fail safe positive locking mechanism.

In one embodiment of the invention, the locking mechanism is associated with the seat and back support frames of a vehicle seat structure to position the frames relative to each other thereby resulting in a reclining seat which may be convertible into a bed. In the above embodiment, the detents are pawls adapted to engage notches staggered on alternate edges of an arm affixed to a hinge plate of the seat frame. The pawls are biased against the arm by suitable spring means. Engagement of the pawl with a notch positively locks the position of the frames relative to each other thereby preventing movement about their pivot connection. Release of the frames is accomplished by a lever actuated contacting means in the form of a cam which contacts the pawls one at a time to alternately pivot the pawls and remove them from the notches.

The present locking mechanism is one having fail safe operation in predetermined incremental steps of movement over a range of movement for pivotally connected members with positive locking against movement in either a clockwise or counterclockwise direction. Further, the mechanism has simplicity of design resulting in an inexpensive but rugged mechanism having little or no maintenance.

BRIEF DESCRIPTION OF THE DRAWINGS

Other objects and advantages of the invention will become readily apparent to one skilled in the art from reading the following detail description of an embodiment of the invention when considered in the light of the accompanying drawings in which.

DESCRIPTION OF THE PREFERRED EMBODIMENT

Figure 1:
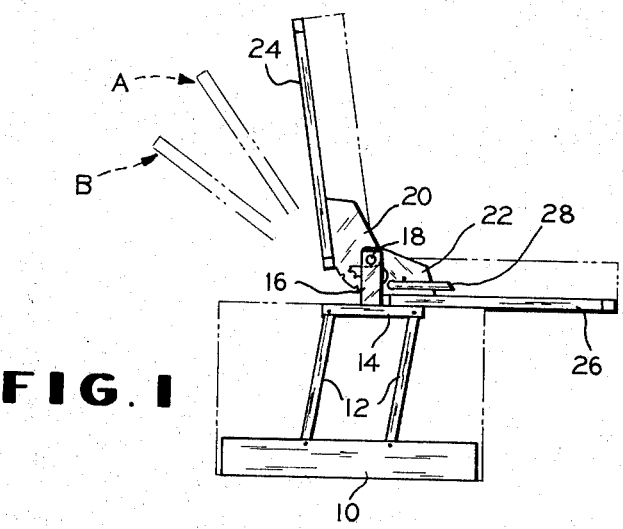
FIG. 1 is an elevational view of a seat structure including apparatus embodying the features of the invention illustrating a back support frame at generally right angles to a seat frame and optional positions of the back support frame in phantom.
Figure 2:
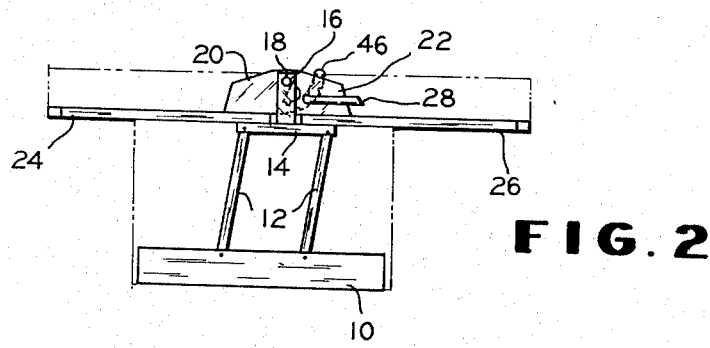
FIG. 2 is an elevational view of the apparatus illustrated in FIG. 1 with the back support frame coplanar with the seat frame.

Referring to the drawings, FIGS. 1 and 2 illustrate a seat structure having a base 10 and generally vertically extending support members 12 attached thereto with a cross tie 14 interconnecting the support members 12 on which is mounted a pivotal support 16. A pivot bar 18 extends across the seat structure to components, identical to components 10 through 16 above, on the opposite side of the seat structure. Pivotally mounted on each end of the pivot bar 18 are a pair of hinge plates 20 and 22 one pair of which are illustrated. The hinge plates 20 and 22 are fixedly attached to and support a back support frame 24 and a seat frame 26 respectively. FIG. 1 illustrates the optional positions A and B to which the frame 24 may be moved by pivoting the hinge plate 20 with respect to the hinge plate 22 about the pivot bar 18. With the frame 24 coplanar with the frame 26, as illustrated in FIG. 2, the seat structure may be converted into a bed structure.

The above seat structure is particularly adapted to illustrating the use, function and features of the present locking mechanism but it should be understood that any pivotally or rotationally movable members requiring positive positioning relative to each other in the manner of the pivotally movable hinge plates 20 and 22 could also employ the locking mechanism of the invention.

Figure 3:
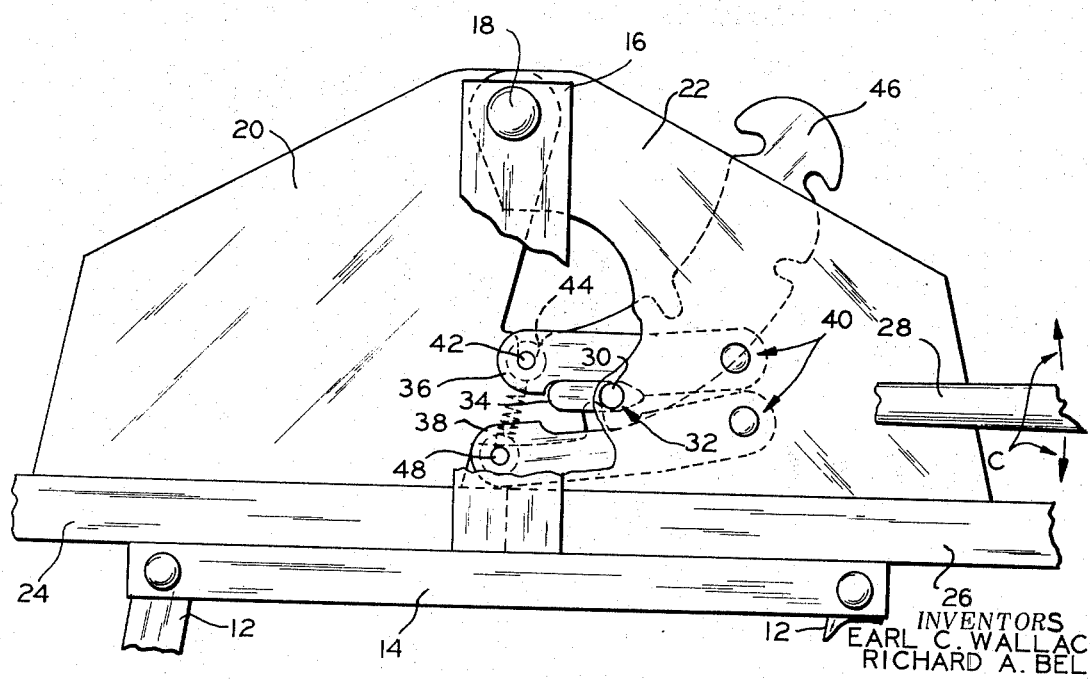
FIG. 3 is an enlarged fragmentary view of a portion of the apparatus illustrated in FIG. 2 with portions thereof cut-away to reveal further detail.

An operating lever 28, for adjusting the position of the frame 24 to position A and B illustrated in FIGS. 1 and 2, is partially cut-away in FIG. 3. As illustrated in FIGS. 1 and 2, the lever 28 is fixedly attached to a shaft 30, more clearly illustrated in FIG. 3. On the other end of the shaft 30, a cam 34 is fixedly attached to alternately engage the pawls or bars 36 and 38. With the bars 36 and 38 pivotally mounted to the hinge plate 22 as at 40, engagement of the cam 34 with the bar 36 by clockwise rotation of the lever 28, as viewed in FIG. 3, and with the bar 38 by counterclockwise rotation results in the bars 36 and 38 being pivoted about the respective pivotal connections 40 in the direction of movement of the cam 34.

Clearly the cam 34 is capable of engaging only one of the bars 36 and 38 at a time. Thus, with the bars 36 and 38 in the position illustrated in FIGS. 3 and 4, the bar 36 is cammed upwardly by moving the cam 34 clockwise to swing the bar 36 to a position where a detent in the form of an engaging member such as a rivet 42 thereon, is out of engagement with engaging means such as a notch 44 on an arm 46 which typically is formed on a rigid extension of the hinge plate 20. The bar 38, having an engaging member in the form of rivet 48 thereon, is free to be engaged by similar engaging means on the edge of the arm 46 opposite the notch 44 such as a notch 50 in FIG. 4. To assure that the bar 38 will be engaged by engaging means, the bar 38 is biased toward the bar 36 by a spring 52 attached to the rivets 48 and 42 of the bars 38 and 36, respectively. The spring 52 maintains the rivets 42 and 48 either in engaging means or against an edge of the arm 46.

Figure 4:
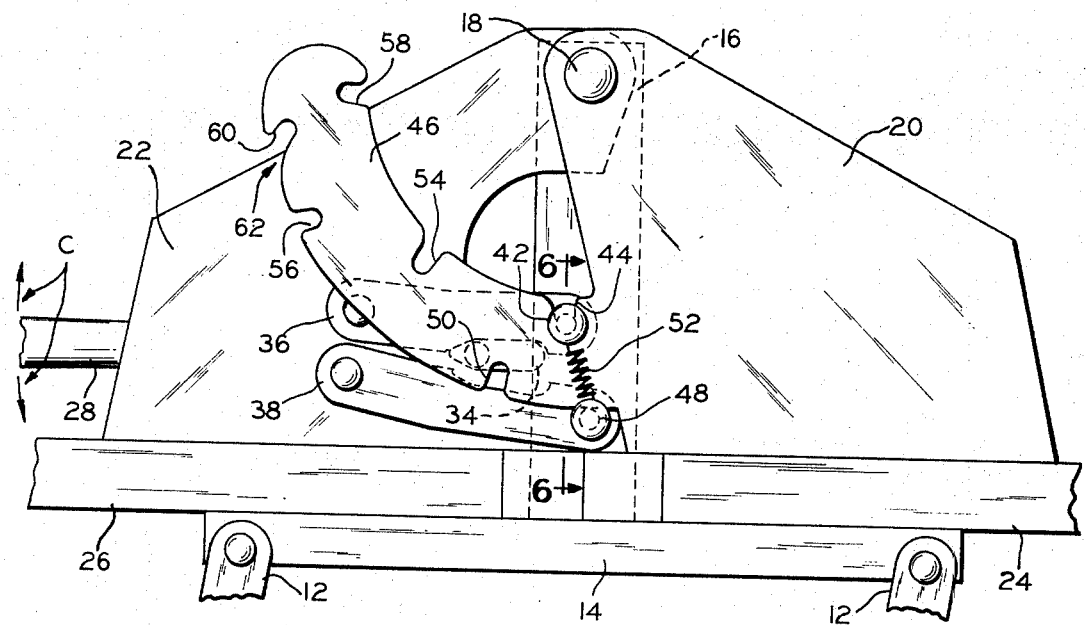
FIG. 4 is a view of the apparatus illustrated in FIG. 3 as viewed from the backside thereof.
Figure 5:
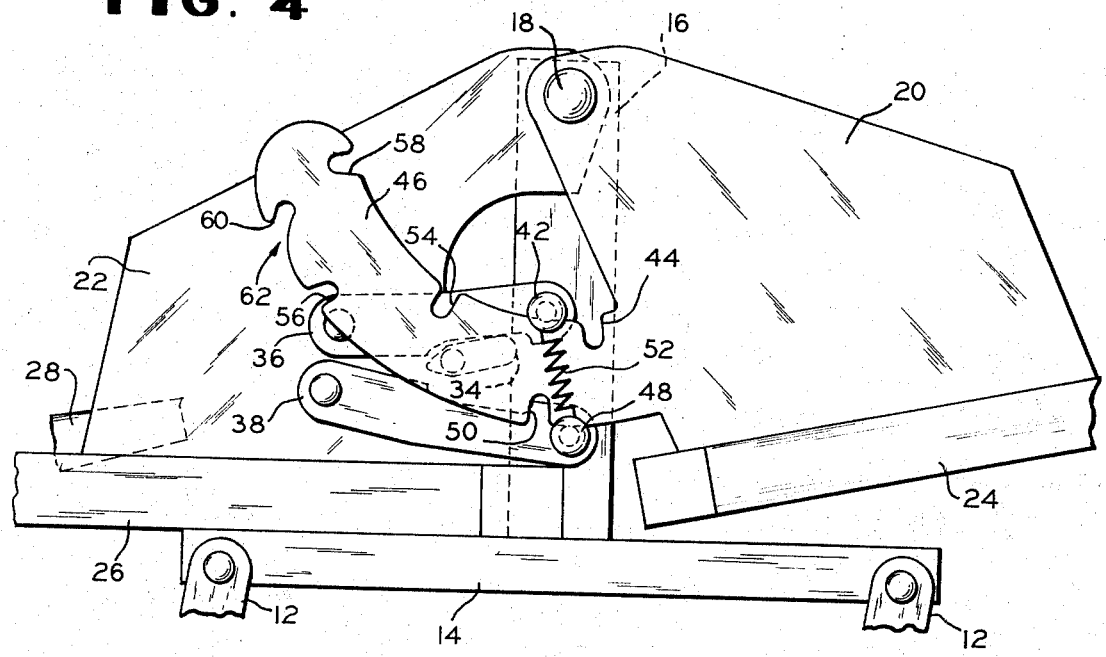
FIG. 5 is an illustration of the apparatus illustrated in FIG. 4 in an intermediate position.

It will be noted from an examination of FIGS. 3, 4 and 5 that the arm 46 is formed on an arc from a radius struck about the pivot bar 18.

Alternative means could be used to maintain the bars 36 and 38 against the arm 46, for example, a leaf spring affixed between the pivotal connections at 40 of the bars 36 and 38 or a spring affixed between the plate 22 and each of the bars 36 and 38. Further, the detent could simply be a continuation of the bars 36 and 38 or any similar pawls as well as a slidable engaging member.

If the engaging means for the rivets 42 and 48 are staggered on either side of the arm 46, one or the other of the rivets 42 and 48 will always be in a condition to engage the engaging means when the counterpart is being released. Th above components form a safety locking mechanism of a fail safe nature wherein the hinge plates 20 and 22 may be pivoted with respect to one another by using the lever 28 to release the arm 46 for incremental movement past the rivet 42 until there is engagement by the rivet 48 with retaining means on the arm 46 attached to the hinge plate 20.

Clearly, the arm 46 could be extended to accommodate movement of members, such as the hinge plates 20 and 22, beyond a 90° arcuate path, and could even accommodate rotationally mounted members as well as pivotal members. The engaging means such as the notches 44 and 50 should be staggered from edge to edge of the arm 46, but the number required in a series is only limited by the number of positions desired between the members rotatable or pivotal with respect to one another, such as positions A and B of FIG. 1, and the largest incremental movement considered safe for the particular use intended.

Positioning of the frame 24 in positions such as A and B corresponds to engagement of rivets 42 and 48 in the notches 50, 54, and 56 as clearly illustrated in FIG. 4. Note that as each of the notches 50, 54 and 56 is engaged by one of the rivets 42 and 48 its counterpart is armed, i.e., when rivet 48 engages the notch 50, the rivet 42 is intermediate notches 44 and 54 so that relative movement of the hinge plates 20 and 22 in either direction upon release of the rivet 48 from the notch 50, is limited to the distance traveled to engage either the notch 44 or the notch 54.

With the frame 24 in the position illustrated in FIG. 1, the rivet 42 engages the notch 58 and the rivet 48 engages the notch 60 as illustrated in FIG. 4. This is the only time the rivets 42 and 48 are simultaneously engaged and prevents the possibility of disengaging the arm 46 from both of the rivets 42 and 48 which would result in freeing the hinge plates 20 and 22 to move without restriction. With both of the rivets 42 and 48 engaged with notches 58 and 60, respectively, there is a double protection against movement of the frame 24 forward in the direction of frame 26 thereby enhancing the rigidity of the frame 24 in the particular embodiment illustrated. Since the cam 34 cannot release both of the rivets 42 and 48 from the notches 58 and 60 at the same time, the rivets 42 and 48 are slightly offset from one another and the notch 60 is given relief at 62 to enable the arm 46 to displace the rivet 48 upon the cam 34 camming the rivet 42 from the notch 58. However, it should be noted that movement of the arm 46 can only be in the counterclockwise direction when displacing the rivet 48 (as viewed in FIG. 4) and that the locking mechanism is still fail safe because movement can only continue until the rivet 48 engages the notch 56 at which point further movement requires the alternating contact of the cam 34 with the bars 36 and 38, as described above.

FIG. 5 illustrates the locking mechanism in an intermediate position with the cam 34 establishing the position of the bar 36 such that the rivet 42 is clear of the associated engaging means. At the same time, the bar 38 is positioned intermediate the engaging means on the lower edge of arm 46, resulting in the arm 46 being free to move in either direction until the rivet 48 on the bar 38 is engaged by notch 50 on the arm 46 or until the frame 24 is coplanar with frame 26. With the arm 46 free to move, the hinge plates 20 and 22 are also free to pivot with respect to each other. With the pivotal members such as the plates 20 and 22 free to pivot relative to each other, the locking mechanism can be said to be in a released condition.

Figure 6:
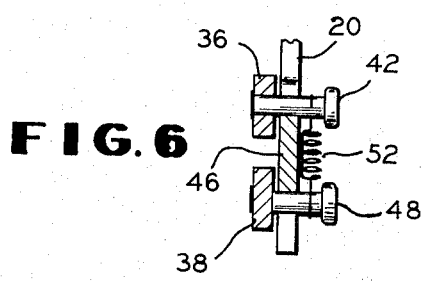
FIG. 6 is a sectional view of the apparatus illustrated in FIG. 4 taken along line 6—6 thereof.

FIG. 6 illustrates the rivets 42 and 48 of the arms 36 and 38 respectively provided with the spring 52 mounted thereon with the heads of the rivets 42 and 48 preventing the spring 52 from sliding off the rivets 42 and 48. It is also noted that the heads of rivets 42 and 48 confine the arm 46 between the hinge plate 22 and the heads of the rivets 42 and 48.

The present locking mechanism is a simply operated one which is fail safe in the automatic arming of the mechanism within a predetermined increment of travel upon release of the mechanism from any of its incremental positions. The small number of components and their uncomplicated design results in an inexpensive but rugged mechanism requiring little or no maintenance. Further, the locking mechanism is adaptable to rotatable and pivotal members with the locking being positive against either direction of movement of the members locked thereby.

In accordance with the provisions of the patent statutes, the principles and mode of operation of the locking mechanism have been explained and what is considered to represent its best embodiment has been illustrated and described. It should, however, be understood that the invention may be practiced otherwise than as specifically illustrated and described without departing from its spirit or scope.

We claim:

1. A locking mechanism comprising:
   a first member;
   a second member pivotally attached to said first member;
   at least two spaced apart detents pivotally attached to said first member;
   means for engaging said detents rigidly attached to said second member, said engaging means including staggered notches to engage only one of said detents in an engaging position at any given time;
   means for biasing said detents into engagement with said engaging means; and
   means pivotally affixed to said first member for selectively disengaging one of said detents from said engaging means to permit relative pivotal movement of said first and second members until the other of said detents is biased into engagement with said engaging means.

2. The combination defined in claim 1 wherein said detents include pawls for pivotal engagement with said engaging means.

3. The combination defined in claim 2 including an engaging member on each of said pawls.

4. The combination defined in claim 1 wherein said engaging means includes an arm extending from said second member, said arm containing said notches.

5. The combination defined in claim 4 wherein said arm is arcuate and formed on a radius struck from the pivotal attachment of said first and second members.

6. The combination in claim 1 wherein said means for biasing includes a spring load on said detents.

7. The combination defined in claim 3 wherein said means for biasing includes a spring interconnecting said engaging members.

8. The combination in claim 1 wherein said means for selectively disengaging one of said detents includes a cam to engage said detents.

9. The combination in claim 8 including a lever pivotally mounted on said second member and affixed to said cam for actuating said cam.

* * * * *